United States Patent
Yasuda et al.

(10) Patent No.: US 7,329,025 B2
(45) Date of Patent: Feb. 12, 2008

(54) PRODUCTION METHOD OF VEHICLE LAMP

(75) Inventors: Ryosuke Yasuda, Shizuoka (JP); Fujihiko Sugiyama, Shizuoka (JP); Kazuhiro Yamazaki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 252 days.

(21) Appl. No.: 11/130,527

(22) Filed: May 17, 2005

(65) Prior Publication Data

US 2005/0266762 A1 Dec. 1, 2005

(30) Foreign Application Priority Data

May 25, 2004 (JP) ............................. 2004-154493

(51) Int. Cl.
*F21K 7/00* (2006.01)

(52) U.S. Cl. .................. 362/259; 362/267; 156/272.8; 219/121.65; 219/121.66

(58) Field of Classification Search ................ 362/259, 362/267, 520, 546; 219/121.65, 121.66; 156/272.8

See application file for complete search history.

(56) References Cited

U.S. PATENT DOCUMENTS

| | | | |
|---|---|---|---|
| 6,592,239 B1 * | 7/2003 | Akiyama et al. ........... 362/267 |
| 2001/0028568 A1 | 10/2001 | Akiyama et al. | |
| 2005/0030751 A1 * | 2/2005 | Matsunaga et al. ......... 362/267 |
| 2006/0126355 A1 * | 6/2006 | Yasuda et al. .............. 362/546 |

FOREIGN PATENT DOCUMENTS

| | | |
|---|---|---|
| DE | 101 09 595 | 10/2001 |
| DE | 101 49 682 | 5/2002 |
| DE | 202 03 773 | 6/2002 |
| DE | 10 2004 037 517 | 3/2005 |
| EP | 1 518 664 | 3/2005 |
| JP | 11-348132 | 12/1999 |
| JP | 2000-294012 | 10/2000 |
| JP | 2000-294013 | 10/2000 |
| JP | 2001-243811 | 9/2001 |
| JP | 2001-243812 | 9/2001 |
| JP | 2002-18961 | 1/2002 |
| JP | 2004-349123 | 12/2004 |
| JP | 2005-85567 | 3/2005 |
| WO | WO-03/004211 | 1/2003 |

OTHER PUBLICATIONS

English Patent Abstract of JP2000294012 from esp@cenet.
English Patent Abstract of JP2000294013 from esp@cenet.

(Continued)

*Primary Examiner*—Stephen F Husar
(74) *Attorney, Agent, or Firm*—Osha Liang LLP

(57) ABSTRACT

A vehicle lamp includes an outer lens and an inner lens disposed inside the outer lens. The inner lens covers an area narrower than the outer lens and is supported with the body by laser welding. The inner lens and the body respectively have joint areas. A laser absorber is contained in an interface between the joint areas. The joint areas are overlapped and laser beam is emitted to the laser absorber from behind the joint area of the inner lens.

17 Claims, 5 Drawing Sheets

OTHER PUBLICATIONS

English Patent Abstract of JP2001243811 from esp@cenet.
English Patent Abstract of JP2001243812 from esp@cenet.
French Preliminary Search Report for French Patent Application No. 0505187, dated Apr. 25, 2007, 5 pages.
Potente H. et al., "Etude A Propos D'Une Nouvelle Technique De Soudage Laser Par Transmission", Soudages et Techniques Connexes, Institut de Soudure, Mar. 2002, pp. 3-8, vol. 56, No. 3/4, XP001125347, ISSN: 0246-0963, Paris, France.
Klein J. et al., "lst Laserstrahlschweissen Wirtschaftlich?", Kunstoffe, 2004, pp. 49-51, vol. 7, XP001246439, ISSN: 0023-5563, Carl Hanser Verlag, Munchen, Germany.
Kagan V. A et al., "Welding With Light Laser-Transmission Welding Rapidly joins Thermoplastic Parts Without Vibration Or Excess Heat", Machine Design, Aug. 3, 2000, pp. 79-82, vol. 72, No. 15, XP001198872, ISSN: 0024-9114, Penton Media, Cleveland, OH, US.

German Office Action for German Patent Application No. 10 2005 024 076.3-54, dated Sep. 14, 2007, and English translation thereof, 6 pages.

* cited by examiner

PRODUCTION METHOD OF VEHICLE LAMP

The present application claims foreign priority based on Japanese Patent Application No. P.2004-154493, filed on May 25, 2004, the contents of which are incorporated herein by reference.

BACKGROUND OF THE INVENTION

1. Field of the Invention

The present invention relates to a method of producing vehicle lamps. More particularly, the present invention relates to the art of ensuring that two members including an inner lens are joined together with an improved external appearance in the method of producing a vehicle lamp having the inner lens disposed inside an outer lens such that the inner lens covers an area narrower than the outer lens and that two members including the inner lens are joined together by laser welding.

2. Related Art

In producing a vehicle lamp having an inner lens disposed inside an outer lens such that the inner lens covers an area narrower than the outer lens, the inner lens has heretofore been fitted to the outer lens by ultrasonic welding or fixed to a body by lance mating, for example.

When the inner lens is joined to the outer lens by ultrasonic welding as described above, there has existed a problem of deteriorating the external appearance of the lenses in that the weld between the outer lens and the inner lens is seen through the outer lens, that the compatibilized portion between the outer lens and the inner lens is jutted out aside or that the jutted-out portion is seen through the outer lens. In the case where an inner lens and a body are injection-molded pieces, when the inner lens is fitted to the body by lance mating, the presence of an overlapped portion in the direction in which the mold like a lance is taken out makes a hole for taking out the mold in the rear of the portion above (in the direction in which the mold is taken out). Consequently, the portion on the back side of the lighting device is seen through the hole, which also deteriorates the external appearance.

In addition, there also develops a problem of taking time for assembly work and machining under the prior art method described above.

SUMMARY OF THE INVENTION

In accordance with one or more embodiments of the present invention, in a method of producing a vehicle lamp having an inner lens disposed inside an outer lens such that two members including the inner lens are joined together by laser welding to cover an area narrower than the outer lens, the two members that are joined together have joint areas, respectively; and the method thereof comprises the steps of putting the joint areas on top of each other with a laser absorber contained in the interface therebetween and emitting laser beam to the laser absorber from behind the joint area of one of the member.

Therefore, the method of producing a vehicle lamp according to one or more embodiments ensures that the two members including the inner lens are joined together in a short time with an excellent external appearance.

In the method of producing a vehicle lamp according to one or more embodiments, the laser welding is employed for joining purposes, so that the joining work can be done in a short time. Moreover, as irradiation energy toward the laser absorber is made readily controllable without allowing any excessive compatible portion to be jutted out a side, an excellent external appearance is offered.

As the laser absorber becomes transparent by laser beam irradiation, only the undercoat color is seen through the inner lens, so that there is no fear of deteriorating the external appearance in this respect.

In accordance with one or more embodiments of the present invention, the laser absorber is kneaded into the resin material of the inner lens, whereby since the cubic volume of the inner lens is smaller than those of the outer lens and the body, only a small amount of the laser absorber is needed to cope with the requirements, which results in making the use of the laser absorber less costly.

In accordance with one or more embodiments of the present invention, the step of emitting laser beam further includes passing the laser beam through the inner lens and converging the laser beam to the joint area of the inner lens, whereby the irradiation energy of the laser beam effectively acts on the laser absorber.

In accordance with one or more embodiments of the present invention, the laser absorber is applied by, for example, painting to the joint area of the member facing the joint area of the inner lens and the laser beam is emitted through the inner lens, whereby only a small amount of laser absorber for use will suffice.

In accordance with one or more embodiments of the present invention, the adoption of the form of inserting a sheet with the laser absorber kneaded in, between the joint areas of the two members results in making reducible the amount of laser absorber used.

Other aspects and advantages of the invention will be apparent from the following description and the appended claims.

REFERENCE NUMERALS AND CHARACTERS

10 . . . vehicle lamp, 20 . . . body (another member), 23 . . . joint area, 30 . . . inner lens, 32 . . . joint area, 40 . . . outer lens, 60 . . . laser absorber, 71 . . . laser beam, 80 . . . sheet in which laser absorber is kneaded

DESCRIPTION OF THE PREFERRED EMBODIMENTS

Next, embodiments of the invention will be described with reference to the accompanying drawings.

Figure 1A:
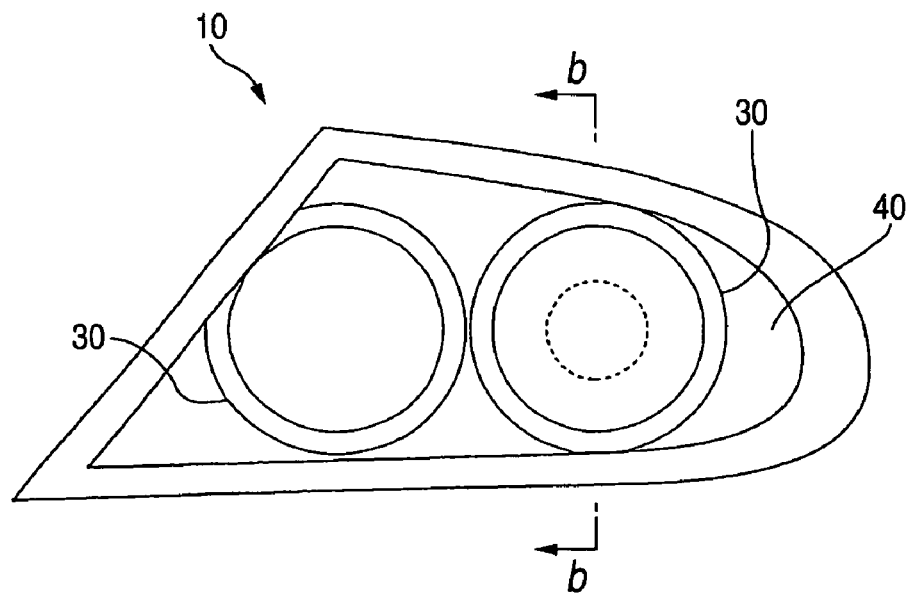
FIG. 1A is a schematic front view of a vehicle lamp to be made by way of example under a method of producing a vehicle lamp according to one or more embodiments of the present invention.
Figure 1B:
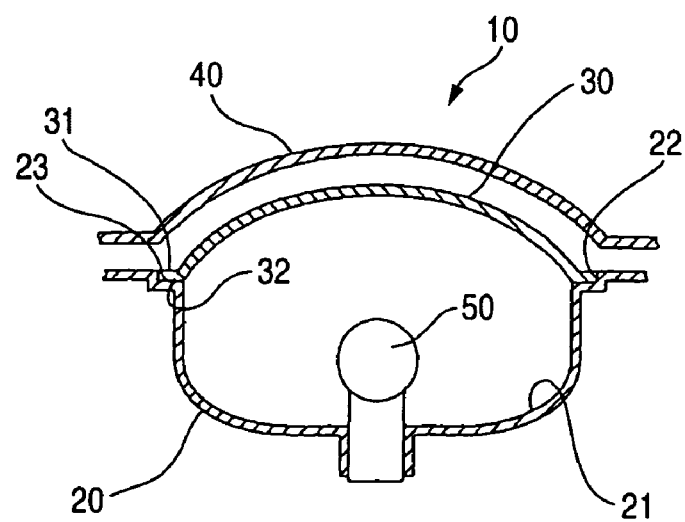
FIG. 1B is a schematic sectional view taken on line b-b of FIG. 1A.

FIG. 1A and FIG. 1B show an example of a vehicle lamp to be produced according to one or more embodiments of the present invention.

A vehicle lamp 10 is provided with a body 20 having two concave portions 21 opening forward (only one of them is shown in FIG. 1B). The front faces of the concave portions 21 are respectively covered with inner lenses 30. The outside with the inner lenses 30 provided thereon is covered with an outer lens 40. Further, light source bulbs 50 (only one of them is shown in FIG. 1B) are supported by the body 20 so that the light source bulbs are positioned inside the respective concave portions 21.

The body 20, the inner lenses 30, and the outer lens 40 are formed of thermoplastic resin by injection molding. The inner lenses 30 are supported with the body 20 by laser welding.

A stepped portion 22 is formed in the open edge part of the concave portion 21 of the body 20 and the forwardly-directed area 23 of the stepped portion is made a joint area.

An outwardly-projected edge 31 is formed in the circumferential portion of the inner lens 30 and the rear face 32 of the projected edge 31 is also made a joint area.

The projected edge 31 of the inner lens 30 is mated with the stepped portion 22 of the body 20. The joint area 32 of the inner lens 30 is brought into contact with the joint area 23 of the body 20. At this time, the interface between the joint area 32 of the inner lens 30 and the joint area 23 of the body 20 is brought to such a state that a laser absorber is contained in the interface. In one or more embodiments, it is only required for such a laser absorber to be existent in the interface between the two joint areas 32 and 23, no matter how it is shaped up.

As a form in which the laser absorber exists in the interface between the two joint areas 32 and 23, a laser absorber such as phthalcyanine is kneaded into resin material for use in molding the inner lens 30 or the body 20 and then the inner lens 30 or the body 20 may be injection-molded by using the resin material with the laser absorber kneaded in. Thus, the interface between the two joint areas 32 and 23 is brought to such a state that the laser absorber exists therein. In one or more embodiments, when the laser absorber is kneaded into the molding resin material, the laser absorber is kneaded into a small-sized member in order to make it less costly to form the interface. In other words, kneading the laser absorber into the material for use in molding the inner lens 30 smaller than the body 20 results in reducing the total cost.

As the form of making the laser absorber existent in the interface, a printing method may be used for applying the laser absorber to the joint area 32 of the inner lens 30 or the joint area 23 of the body 20, for example.

There is also created a condition in which the laser absorber is existent in the interface by sandwiching a sheet with the laser absorber kneaded in, between the two joint areas 32 and 23.

Figure 2:
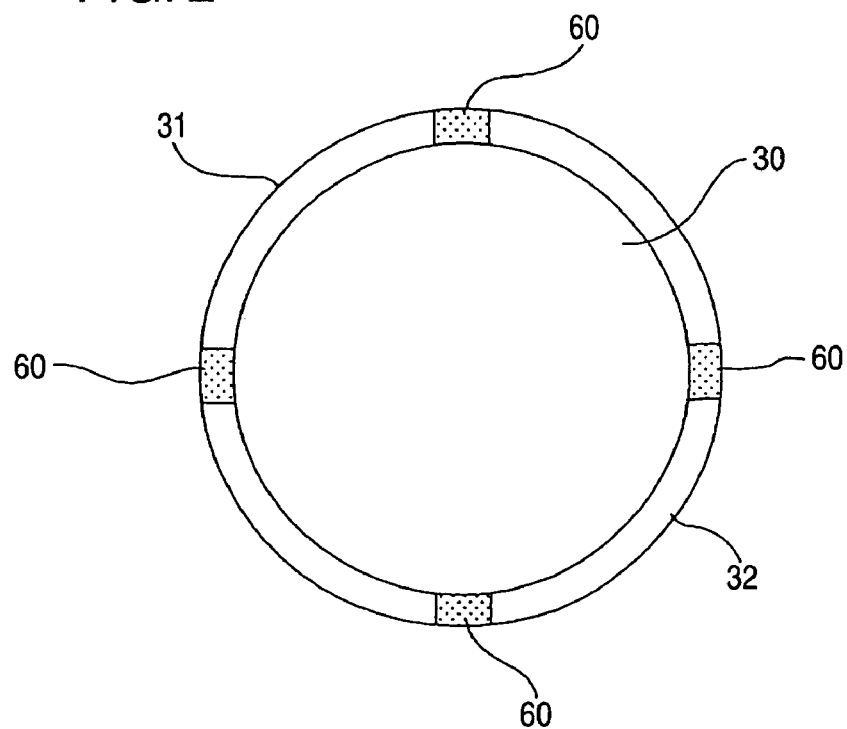
FIG. 2 is a rear view of an inner lens as an example of what has a joint area into which a laser absorber is kneaded.

In one or more embodiments, when the inner lens 30 is laser-welded to the body 20, it is unnecessary to do the laser welding over the whole circumference of the inner lens 30. In other words, as the interior of the lighting device is made waterproof by the joint portion between the body and the outer lens 40, the inner lens 30 may only be fixed to the body 20 so as to prevent the inner lens 30 from slipping off. As shown in FIG. 2, for example, a laser absorber 60 is applied to four places separated circumferentially at substantially equal intervals along the joint area 32 of the inner lens 30, so that the laser welding may be carried out at these four places.

Figure 3:
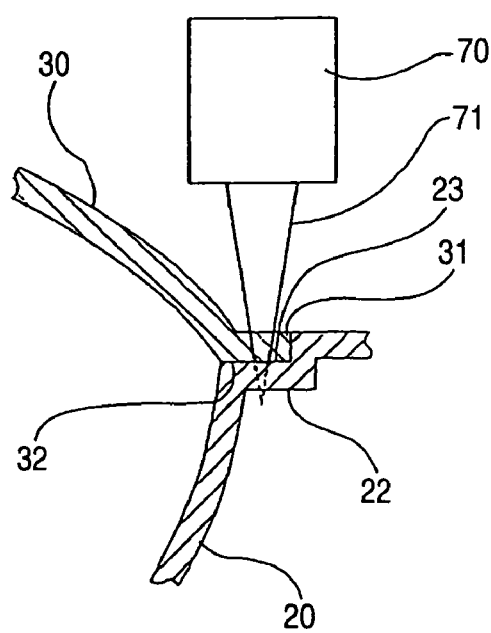
FIG. 3 is a sectional view showing a principal part in a laser welding process by way of example.

FIG. 3 shows a laser welding process with the laser absorber kneaded into the inner lens 30 in order that laser beam 71 emitted from a laser head 70 is passed through the projected edge 31 of the inner lens 30 from the front before being converged to the joint area 32. Accordingly, the laser beam 71 is absorbed by the joint area 32 of the inner lens 30, whereby the joint area 32 generates heat and melts. Further, because of heat conduction, the joint area 23 of the body 20 also generates heat and melts, so that the two joint areas 32 and 23 become compatibilized, fused and fusion-bonded. As the joint areas 32 and 23 cool then, both of them become secured.

Figure 4:
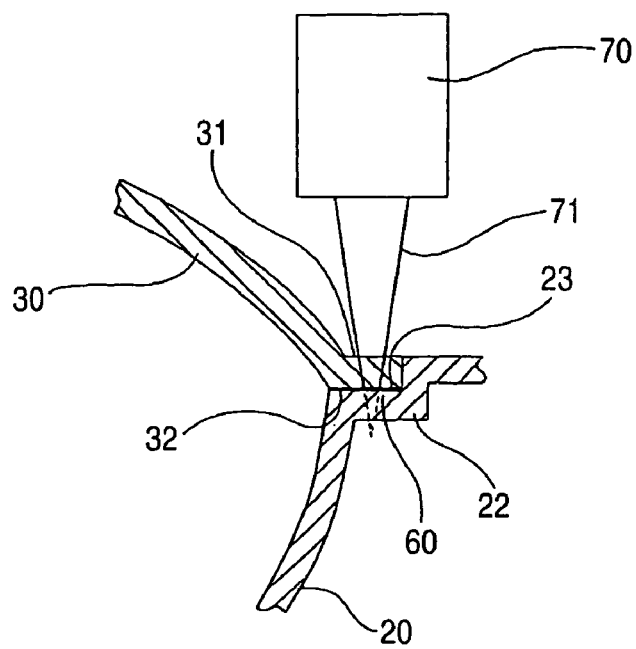
FIG. 4 is a sectional view showing a principal part in another laser welding process by way of example.

FIG. 4 shows a laser welding process with the laser absorber 60 applied to the joint area 32 of the inner lens 30 in order that the laser beam 71 emitted from the laser head 70 is passed through the projected edge 31 of the inner lens 30 from the front before being converged to the laser absorber 60 applied to the joint area 32 of the inner lens 30. Accordingly, the laser beam 71 is absorbed by the laser absorber 60 applied to the joint area 32 of the inner lens 30, whereby the laser absorber 60 generates heat. Because of heat conduction, the joint area 32 of the inner lens 30 and the joint area 23 of the body also generate heat and melts, so that the two joint areas 32 and 23 are compatibilized, fuses and fusion-bonded. As the joint areas 32 and 23 cool then, both of them become secured.

Figure 5:
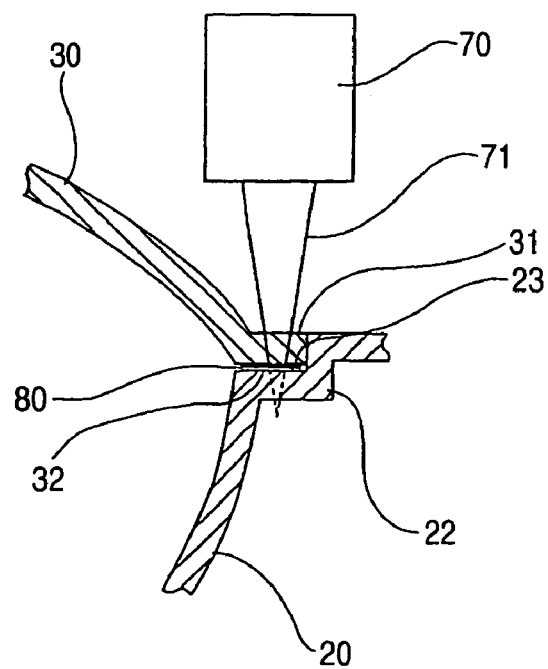
FIG. 5 is a sectional view showing a principal part in still another laser welding process by way of example.

FIG. 5 shows a laser welding process with a sheet 80 with the laser absorber kneaded in and sandwiched between the joint area 32 of the inner lens 30 and the joint area of the body 20 in order that the laser beam 71 emitted from the laser head 70 is passed through the projected edge 31 of the inner lens 30 from the front before being converged to the sheet 80 with the laser absorber kneaded in. Accordingly, the laser beam 71 is absorbed by the sheet 80 mixed with the laser absorber, whereby the sheet 80 generates heat. Because of heat conduction, the joint area 32 of the inner lens 30 and the joint area 23 of the body also generate heat and melts, so that the two joint areas 32 and 23 are compatibilized, fused and fusion-bonded. As the joint areas 32 and 23 cool then, both of them become secured.

Figure 6:
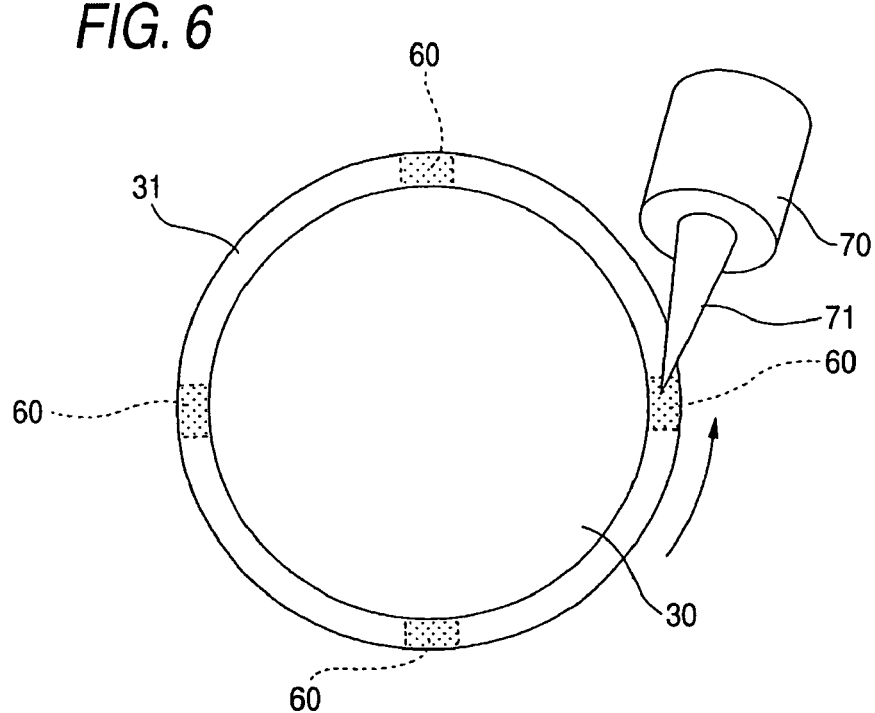
FIG. 6 is a schematic drawing showing a laser beam emission method.
Figure 7:
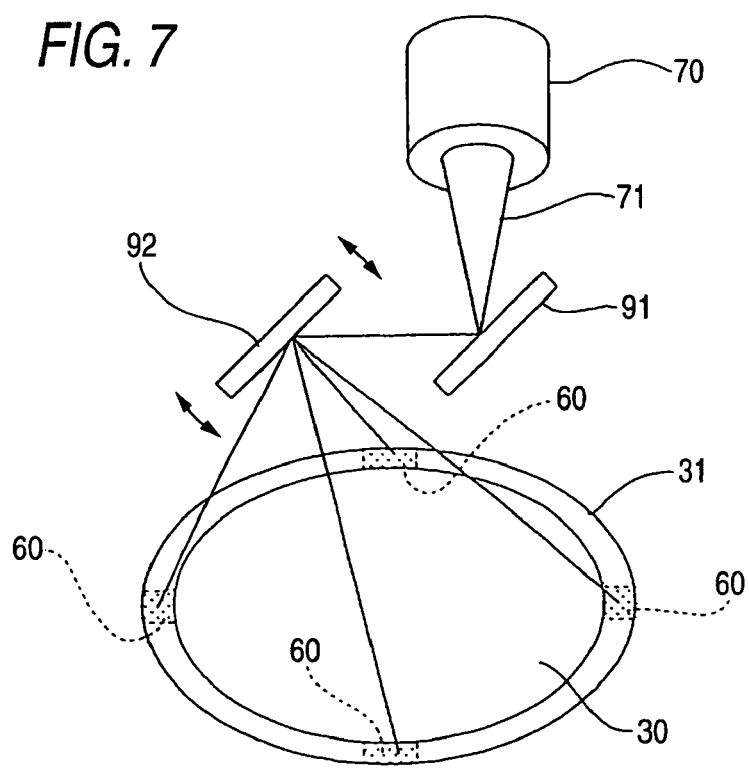
FIG. 7 is a schematic drawing showing another laser beam emission method.
Figure 8:
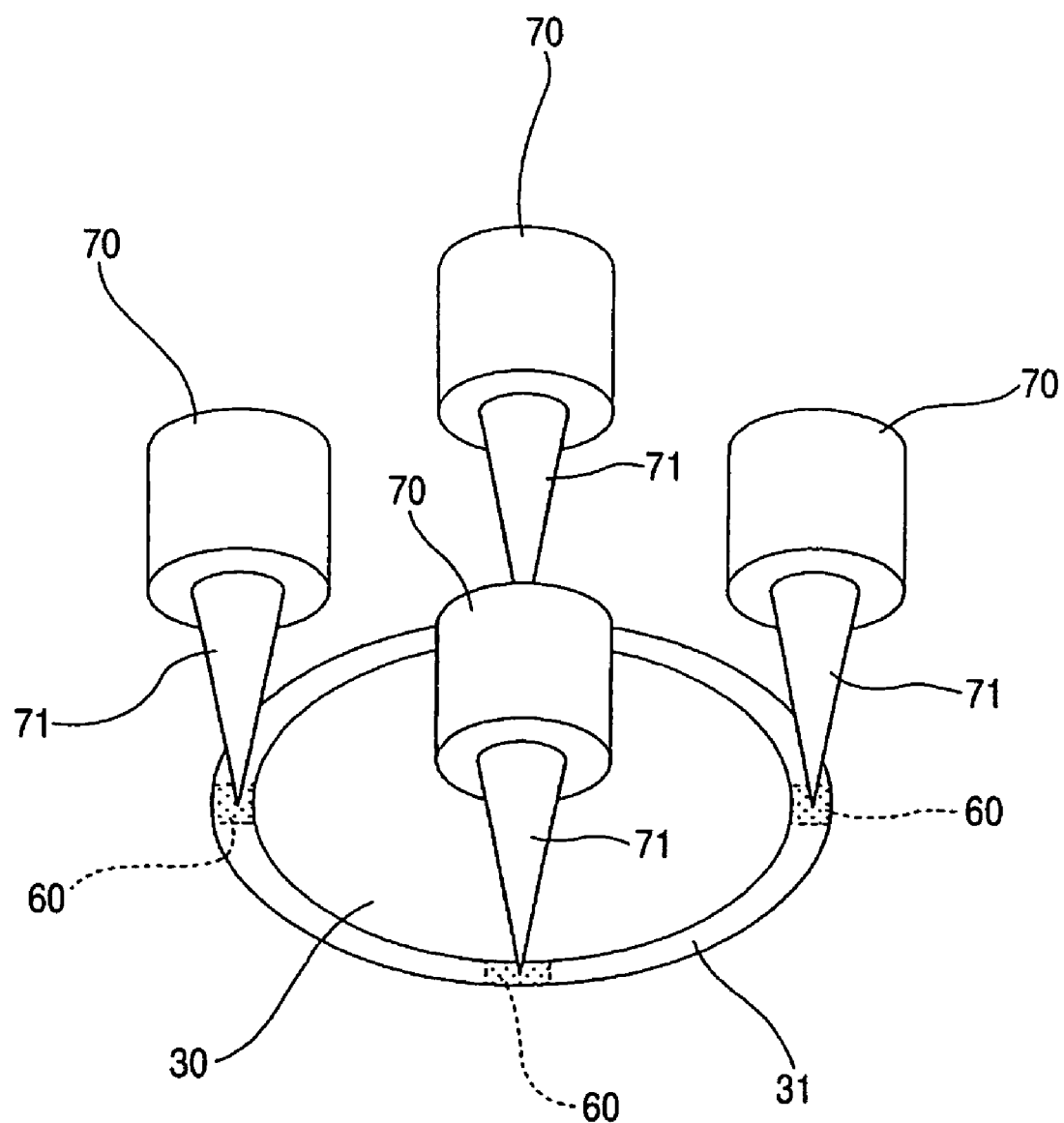
FIG. 8 is a schematic drawing showing still another laser beam emission method.

There are various methods of emitting the laser beam 71, including, for example: a scanning method as shown in FIG. 6 involves making the laser head 70 perform scanning in the direction of an arrow so as to emit the laser beam 71 at fusion-bonding places x, x, . . . ; a mirror control method of FIG. 7 involves guiding the laser beam 71 to a galvano mirror 92 via a mirror 91 with the laser head 70 fixed so as to emit the laser beam 71 to prescribed fusion-bonding places x, x, . . . by turning the galvano mirror 92 (the laser beam 71 is emitted only when the galvano mirror 92 is angled as designated); and a flash method of FIG. 8 involves using a plurality of fixed laser heads 70, 70, . . . so as to emit laser beams 71, 71, . . . to several welding places x, x, . . . at a time.

As described above, since the inner lens and other members are joined together by the laser welding in the method of producing vehicle lamps according to one or more embodiments of the present invention, the joining work can be done in a short time. Moreover, as irradiation energy toward the laser absorber is made readily controllable without allowing any excessive compatible portion to be jutted out aside, an excellent external appearance is offered.

As the laser absorber becomes transparent by laser irradiation, only the undercoat color is seen through the inner lens, so that there is no fear of deteriorating the external appearance in this respect.

By kneading the laser absorber previously into the material of one of the members that are joined as a method of providing the laser absorber, work in the process of incorporating the inner lens is simplified, whereby a reduction in costs can be brought about.

Furthermore by applying the laser absorber results in increasing the number of working man-hours during the process of incorporating the inner lens, the material cost can be reduced in comparison with the case where the laser absorber is kneaded into the material of the member.

The adoption of the form of inserting the sheet with the laser absorber kneaded in, between the joint areas of the two members results in making reducible the amount of laser absorber required to be used.

In a vehicle lamp having inner lenses, one or more embodiments of the present invention are suitable for use in ensuring that the inner lenses and other members are joined with an improved external appearance.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A method of producing a vehicle lamp comprising:
    mating a joint area of an inner lens and a joint area of a body, wherein a laser absorber is contained in an interface between the mated joint areas; and
    emitting a laser beam to the laser absorber to laser weld the inner lens and the body together,
    wherein the laser absorber is kneaded into a resin material of the inner lens.

2. The method of producing a vehicle lamp according to claim 1, wherein emitting the laser beam further comprises passing the laser beam through the inner lens and converging the laser beam to the joint area of the inner lens.

3. The method of producing a vehicle lamp according to claim 1, wherein the resin material of the inner lens is a thermoplastic resin.

4. The method of producing a vehicle lamp according to claim 1, wherein the inner lens and the body are made by injection molding.

5. A method of producing a vehicle lamp comprising:
    mating a joint area of an inner lens and a joint area of a body, wherein a laser absorber is contained in an interface between the mated joint areas; and
    emitting a laser beam to the laser absorber to laser weld the inner lens and the body together,
    wherein the laser absorber is applied by painting.

6. The method of producing a vehicle lamp according to claim 5, wherein the laser absorber is applied to the joint area of the body facing the joint area of the inner lens.

7. A method of producing a vehicle lamp comprising:
    mating a joint area of an inner lens and a joint area of a body, wherein a laser absorber is contained in an interface between the mated joint areas; and
    emitting a laser beam to the laser absorber to laser weld the inner lens and the body together,
    wherein a sheet is inserted between the joint areas of the inner lens and the body, and the laser absorber is kneaded into the sheet.

8. A method of producing a vehicle lamp comprising:
    mating a joint area of an inner lens and a joint area of a body, wherein a laser absorber is contained in an interface between the mated joint areas; and
    emitting a laser beam to the laser absorber to laser weld the inner lens and the body together,
    wherein the inner lens is disposed inside an outer lens so as to cover an area narrower than the outer lens.

9. The method of producing a vehicle lamp according to claim 8, wherein the inner lens, the body, and the outer lens are made by injection molding.

10. A vehicle lamp comprising:
    an inner lens having a joint area;
    a body having a joint area, wherein the joint area of the inner lens mates with the joint area of the body; and
    a laser absorber contained in an interface between the mated joint areas, wherein the mated joint areas are laser welded together by emitting a laser beam to the laser absorber,
    wherein the laser absorber is kneaded into a resin material of the inner lens.

11. The vehicle lamp according to claim 10, wherein the resin material of the inner lens is a thermoplastic resin.

12. The vehicle lamp according to claim 10, wherein the inner lens and the body are made by injection molding.

13. A vehicle lamp comprising:
    an inner lens having a joint area;
    a body having a joint area, wherein the joint area of the inner lens mates with the joint area of the body; and
    a laser absorber contained in an interface between the mated joint areas, wherein the mated joint areas are laser welded together by emitting a laser beam to the laser absorber,
    wherein the laser absorber is applied by painting.

14. The vehicle lamp according to claim 13, wherein the laser absorber is applied to the joint area of the body facing the joint area of the inner lens.

15. A vehicle lamp comprising:
    an inner lens having a joint area;
    a body having a joint area, wherein the joint area of the inner lens mates with the joint area of the body;
    a laser absorber contained in an interface between the mated joint areas, wherein the mated joint areas are laser welded together by emitting a laser beam to the laser absorber; and
    a sheet inserted between the joint areas of the inner lens and the body, wherein the laser absorber is kneaded into the sheet.

16. A vehicle lamp comprising:
    an inner lens having a joint area;
    a body having a joint area, wherein the joint area of the inner lens mates with the joint area of the body; and
    a laser absorber contained in an interface between the mated joint areas, wherein the mated joint areas are laser welded together by emitting a laser beam to the laser absorber,
    wherein the inner lens is disposed inside an outer lens so as to cover an area narrower than the outer lens.

17. The method of producing a vehicle lamp according to claim 16, wherein the inner lens, the body, and the outer lens are made by injection molding.

* * * * *